United States Patent [19]

Nolan et al.

[11] Patent Number: 5,735,533
[45] Date of Patent: *Apr. 7, 1998

[54] CAVITY DEPTH INCREASING RETAINER

[75] Inventors: Terence J. Nolan; Jeffrey E. Swensen, both of Eldersburg; J. Loyd Spence, Elkridge, all of Md.

[73] Assignee: EG&G Pressure Science, Inc., Beltsville, Md.

[*] Notice: The term of this patent shall not extend beyond the expiration date of Pat. No. 5,730,448.

[21] Appl. No.: 778,636

[22] Filed: Jan. 3, 1997

[51] Int. Cl.$^6$ .................................... F16J 15/06
[52] U.S. Cl. ............................. 277/630; 277/639
[58] Field of Search ................. 277/1, 9, 11, 180, 277/181, 183, 189, 235 B

[56] References Cited

U.S. PATENT DOCUMENTS

| | | | |
|---|---|---|---|
| 2,339,478 | 1/1944 | Hoheisel | 277/180 |
| 2,795,444 | 6/1957 | Nenzell | 277/180 |
| 3,499,655 | 3/1970 | Czernik et al. | 277/235 B |
| 3,578,346 | 5/1971 | Jelinek | 277/180 |
| 3,857,572 | 12/1974 | Taylor et al. | 277/9.5 |
| 3,871,668 | 3/1975 | Coker et al. | 277/180 |
| 4,114,906 | 9/1978 | Jelinek | 277/180 |
| 4,348,032 | 9/1982 | Hanson et al. | 277/235 B |
| 4,648,607 | 3/1987 | Yamada | 277/9 |
| 4,813,691 | 3/1989 | Schoenborn | 277/238 B |
| 5,011,162 | 4/1991 | Jelinek | 277/11 |
| 5,145,190 | 9/1992 | Boardman | 277/235 B |
| 5,364,109 | 11/1994 | Sihon | 277/9 |
| 5,375,851 | 12/1994 | Mockenhaupt | 277/9 |
| 5,518,257 | 5/1996 | Breaker | 277/180 |
| 5,529,313 | 6/1996 | Malks | 277/11 |
| 5,564,714 | 10/1996 | Katsuno et al. | 277/181 |
| 5,580,065 | 12/1996 | Ueta | 277/180 |

OTHER PUBLICATIONS

Pressure Science Incorporated Catalog—"Tayor's Resilient Metallic Seals"—1981—pp. 2,6 and 23.

*Primary Examiner*—Scott Cummings
*Attorney, Agent, or Firm*—Roylance,Abrams,Berdo & Goodman, L.L.P.

[57] ABSTRACT

A sealing assembly is disclosed for creating a seal between first and second mating members or components. The sealing assembly basically includes a seal retainer with one or more annular seals coupled thereto. The seal retainer including a substantially flat body portion lying in a plane and with at least one resilient retaining element integrally formed with the body portion as a one-piece, unitary member for engaging the seal or seals to retain the seal or seals thereto. In the preferred embodiment, the seal retainer is folded to form three layers. In particular, the body portion of the seal retainer has a main supporting layer with four tabs foldably coupled thereto.

32 Claims, 4 Drawing Sheets

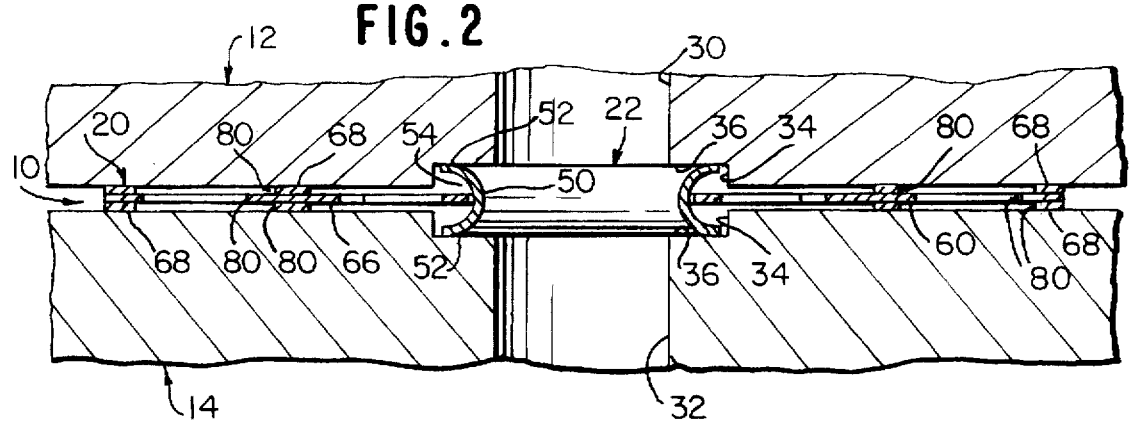
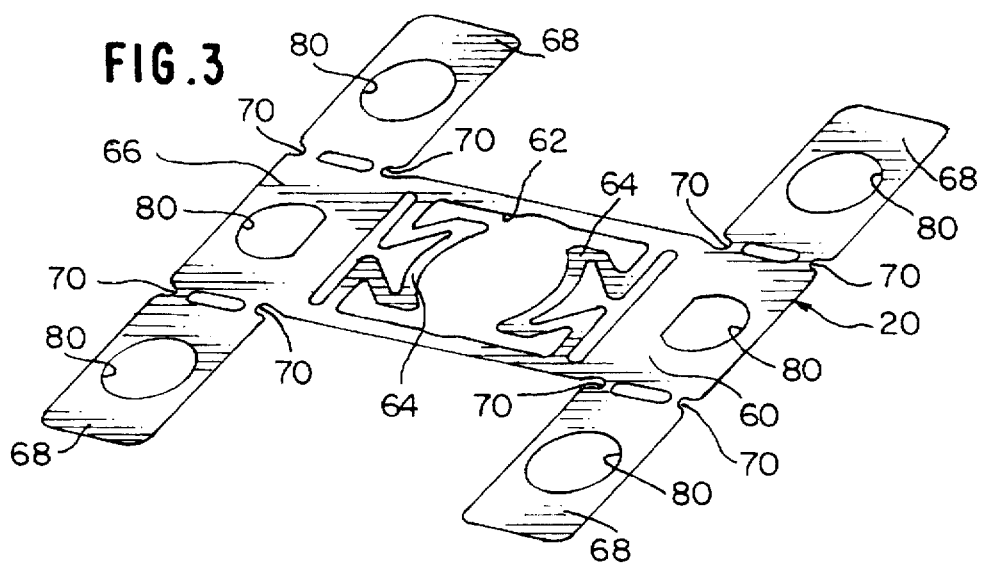
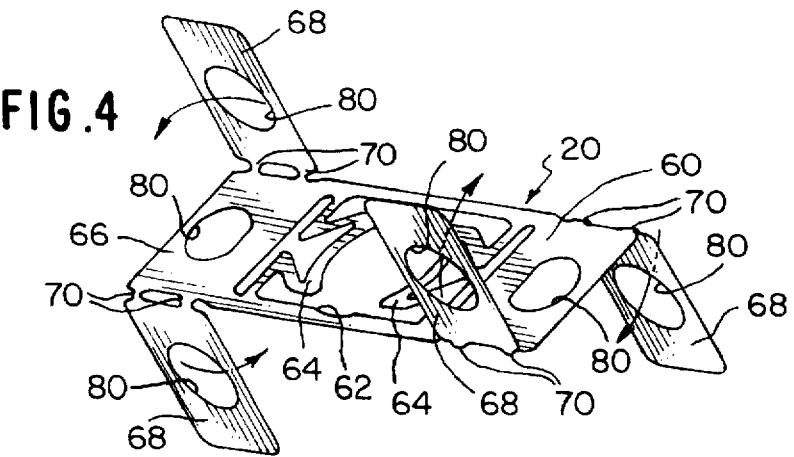

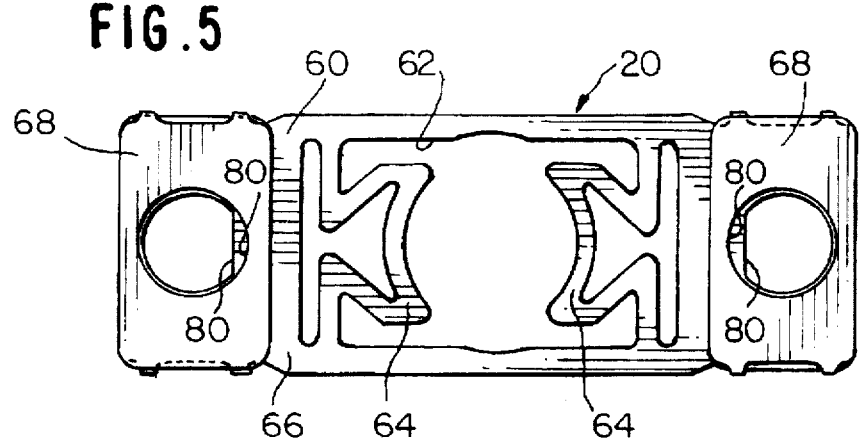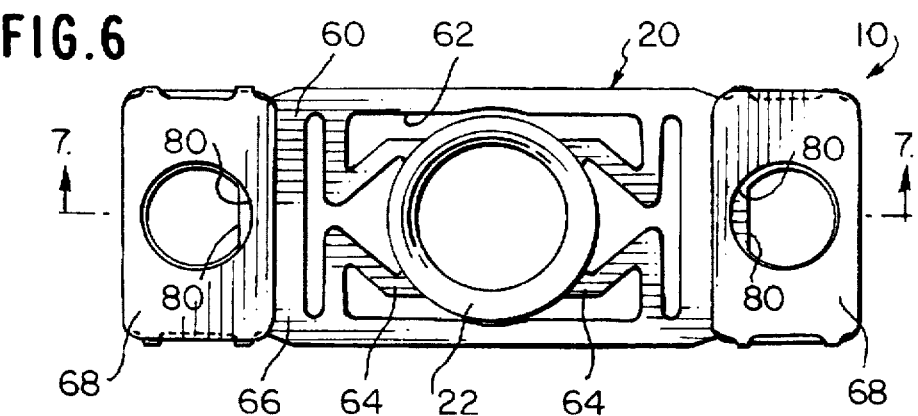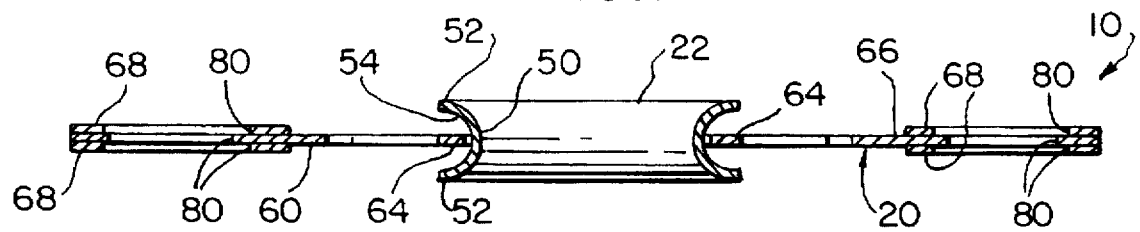

CAVITY DEPTH INCREASING RETAINER

FIELD OF THE INVENTION

The present invention generally relates to a seal retainer which holds one or more seals. More specifically, the present invention relates to a seal retainer with integrally formed retaining members for retaining and positioning one or more seals between a pair of mating members or components with orifice(s), port(s) or counterbore(s) to be sealed. The seal retainer has a thickness which increases the effective cavity depth of the counterbore(s) such that a different size seal can be used between the mating members.

BACKGROUND OF THE INVENTION

Seals of various types and shapes have been employed to prevent fluid from escaping from a Joint along a fluid flow path or in a fluid receptacle. Joints in the flow path or in a container are of course formed whenever two or more members or components are brought together to form a continuous conduit or a fluid receptacle. One common type of seal is a ring seal which is employed between members or components along the flow path, thus, preventing fluid from escaping between the two members. These two members or components often have grooves or counterbores formed therein to receive the ring seal and to form a seal gland.

These ring seals are resilient due to their material and their geometric shape so that the ring seal fills the gap between the adjacent members or components defining the flow path. The desired result is that the ring seal will firmly abut both members or components at all points along the seal so that the gap is completely blocked by the ring seal.

These ring seals can be installed in a variety of ways between the pair of members. The most common method is to merely place the ring seal in the groove or counterbore which forms the seal gland. However, in this method, the seal often moves or shifts during assembly of the two parts. Moreover, it is often difficult in certain applications to assemble the two parts together without the seal falling out of position. This causes the seal to be contaminated or damaged during installation.

It is also known that it is possible to use retainer plates for holding a seal in place to assist in the assembly. One example of a retainer plate is disclosed in U.S. Pat. No. 3,857,572 to Taylor et al. As seen in FIGS. 3 and 4 of the Taylor et al. patent, the ring seals are retained in openings of the retainer plate by a split wire ring which fits in a groove of the retainer plate and engages the outer surface of the ring seal. Also, the retainer plate of the Taylor et al. patent has holes for receiving bolts to secure the retainer plate to the members or components being coupled together.

While the retainer plate of the Taylor et al. patent is useful in certain applications, it may require special tooling to be used in certain circumstances. In particular, the retainer plate of the Taylor et al. patent is designed to be used with a pair of members or components which do not include a counterbore or groove for receiving the ring seal. Rather, the retainer plate of the Taylor et al. patent must have a thickness which permits the proper amount of inward deflection of the ring seal to insure proper sealing. Moreover, the retainer plate of the Taylor et al. patent is a multipart retainer plate which can be more costly to manufacture.

Retainer plates are also known which, to retain the ring seals in place, utilize a friction type fit. For example, a retainer plate could be provided with a circular opening and the ring seal could be made slightly elliptical such that the ring seal is elastically deformed during insertion of the seal into the circular opening. One drawback of this type of retainer plate and seal assembly is that the ring seal typically must have a large diameter such that the elliptical shape can be easily deformed for insertion into the round opening of the retainer plate. Another drawback of this type of retainer plate and seal assembly is that it requires deformation of the seal which can result in the seal being contaminated or damaged during installation. Moreover, this type of retainer plate typically requires a substantially rigid plate with a substantial thickness such that the seal cannot be used with mating members or components having counterbores.

In view of the above, it is apparent to those skilled in the art that there exists a need in the art for a seal retainer which can be used with a pair of mating members or components with at least one of the members or components having a counterbore for receiving the ring seal. Moreover, there exists a need for an inexpensive seal retainer which can be relatively easily manufactured and installed. Moreover, there further exists a need for a seal retainer which permits seals to be installed between a pair of mating members or components without contact by hands or tools which could contaminate or damage the seal or seals. This invention addresses these needs in the art, as well as other needs which will become apparent to those skilled in the art once given this disclosure.

SUMMARY OF THE INVENTION

One object of the present invention is to provide a seal retainer which can be utilized with one or more highly reliable metallic seals to locate and retain the seal or seals with respect to orifice(s), port(s), or counterbore(s) to be sealed.

Another object of the present invention is to provide a seal retainer which can be used with one or more seals to retain the seal retainer to one of the mating members or components prior to coupling of the mating members or components together to prevent loss of the seal or seals in difficult assembly orientations.

Another object of the present invention is to provide a seal retainer which provides the installer with control of the seal or seals in inverted or vertical assembly situations.

Still another object of the present invention is to provide a seal retainer whereby the seal or seals can be installed without contact by hands or tools between the pair of mating members or components to avoid contamination or damage to the seal or seals.

Yet another object of the present invention is to provide a seal retainer that is relatively inexpensive to manufacture.

Another object of the present invention is to provide a seal retainer which is relatively easy to install.

The foregoing objects are basically attained by providing a seal retainer for coupling at least one seal thereto, comprising a main layer having a first thickness with at least one seal receiving aperture formed therein; at least one resilient retaining element extending inwardly from the mainlayer into the at least one seal receiving aperture to a free end; and a second layer with a second thickness coupled to and overlapping a portion of the main layer which increases overall thickness of said seal retainer.

The foregoing objects can also be attained by providing a sealing assembly for creating a seal between first and second members, comprising at least one annular seal with first and second longitudinally facing sealing surfaces and an outwardly facing cavity located between the first and second longitudinally facing sealing surfaces; and a seal retainer including a main layer having a first thickness with at least one seal receiving aperture formed therein, at least one resilient retaining element integrally formed with the main layer for engaging the cavity of the at least one seal to retain the at least one seal thereto, and a second layer having a second thickness integrally coupled to the main layer as a one-piece, unitary member and overlapping a portion of the main layer which increases overall thickness of the seal retainer.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a partial, enlarged cross sectional view of sealing assembly illustrated in FIG. 1 after being coupled to the pair of mating members or components in accordance with the present invention;

FIG. 3 is a perspective view of the seal retainer illustrated in FIGS. 1 and 2 in accordance with the present invention, prior to being folded;

FIG. 4 is a perspective view of the seal retainer illustrated in FIGS. 1-3 in accordance with the present invention, after being partial folded;

FIG. 5 is a top plan view of the seal retainer illustrated in FIGS. 1-4 in accordance with the present invention, without the ring seal coupled thereto;

FIG. 6 is a top plan view of the seal retainer illustrated in FIGS. 1-5 in accordance with the present invention, with the ring seal coupled thereto;

FIG. 7 is an enlarged transverse cross sectional view of the seal retainer and the ring seal coupled thereto as illustrated in FIGS. 1-6 and taken along section line 7'7 of FIG. 6.

DETAILED DESCRIPTION OF THE PREFERRED EMBODIMENT

Figure 1:
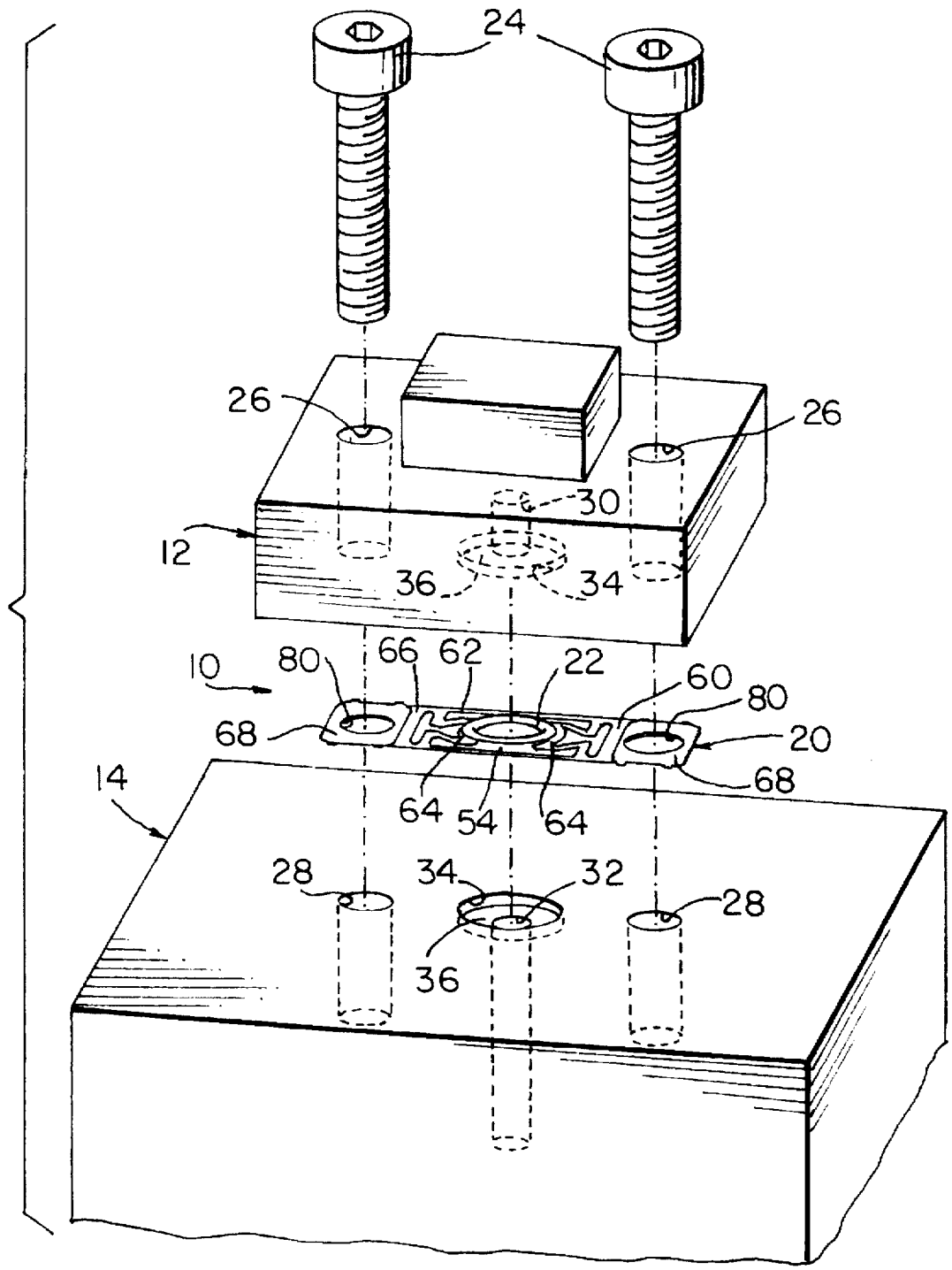
FIG. 1 is a partial exploded perspective view of a sealing assembly with a C-shaped ring seal coupled to a seal retainer in accordance with the present invention, which is to be compressed between a pair of mating members or components to create a seal therebetween.

Referring initially to FIGS. 1 and 2, a sealing assembly 10 in accordance with the present invention is illustrated prior to (FIG. 1) and after (FIG. 2) being coupled between a pair of mating members or components 12 and 14. Sealing assembly 10 basically includes a seal retainer 20 and a seal 22 coupled to seal retainer 20. As explained below in more detail, seal retainer 20 is designed to optimize the overall compression of seal 22. In particular, a seal which is over compressed in a particular installation can be adjusted to its optimum compression by using seal retainer 20 to reduce the amount of compression.

Sealing assembly 10 will only be described and illustrated with a diagrammatic illustration of mating members or components 12 and 14 since it will be readily apparent to those skilled in the art from this disclosure that the precise construction of the seal retainer 20, the number and locations of seals 22 will depend upon the particular application, as well as the particular structure of components 12 and 14.

Sealing assembly 10 is especially useful in the semiconductor process equipment and vacuum equipment industries or any other industries where high reliability and extremely tight sealing is required. In particular, sealing assembly 10 is preferably designed to provide a highly reliable seal. For example, sealing assembly 10 is preferably designed to pass a leakage test on the order of magnitude of $10^{-9}$ cc/sec helium.

In the example illustrated in FIGS. 1 and 2, component 12 is releasably coupled to component 14 via a pair of bolts or fasteners 24 in a conventional manner. Of course, more or less bolts can be utilized depending upon the application. Component 12 can be, for example, a mass flow controller, while component 14 can be, for example, a manifold or base member. More specifically, component 12 has two bores 26 for slideably receiving fasteners 24 therethrough, while component 14 has two threaded bores 28 for threadedly receiving fasteners 24 therein, such that component 12 is releasably coupled to component 14 via fasteners 24.

Component 12 also preferably includes an orifice 30 which aligns with orifice 32 of component 14 when components 12 and 14 are coupled together. Preferably each of the orifices 30 and 32 of components 12 and 14 also includes a counterbore 34 which is sized to receive a portion of seal 22 therein. Each of the counterbores 34 has a shoulder 36 for engaging seal 22. The overall depth of counterbores 34 is preferably smaller than the longitudinal dimension of seal 22 minus the overall thickness of seal retainer 20 such that shoulders 36 of components 12 and 14 also engage a portion of seal 22 to compress seal 22 therebetween when components 12 and 14 are coupled together.

Seal 22 is preferably a conventional ring seal having a C-shaped cross section with a bight portion 50 and a pair of curved leg portions 52. Of course, other types of annular seals could be used with other types of cross-sections. Moreover, seal 22 does not necessarily need to be round. Rather, seal retainer 20 can be modified to accommodate a wide variety of non-circular shapes. Bight portion 50 and leg portions 52 of seal 22 form an outwardly facing cavity or continuous groove 54. Each of the leg portions 52 of seal 22 has an annular sealing surface for engaging one of the shoulders 36 formed by the counterbores 34 in components 12 and 14.

Preferably, seal 22 is a metallic seal which is constructed of suitable materials such as stainless steel or INCONEL 718. Ring seals such as ring seal 22 are well known in the art, and thus, ring seal 22 will not be discussed or illustrated in detail herein. Rather, seal 22 will only be discussed and illustrated as necessary to understand the present invention. In the illustrated embodiments, seal 22 has an outer diameter of approximately 0.271 inch and an axial dimension of approximately 0.062 inch.

Seal retainer 20 is preferably a very thin piece of resilient metallic material such as stainless steel. Of course, other suitable non-metallic materials, metals or alloys can be used for forming retainer 20.

Seal retainer 20 basically includes a body portion 60 with a seal receiving aperture 62 formed therein and a pair of retaining elements or spring arms 64 extending inwardly from body portion 60 into seal receiving aperture 62.

Referring to FIGS. 3-7, body portion 60 is a multilayer member which is preferably formed by stamping and folding a sheet material to obtain the desired thickness. More specifically, body portion 60 includes a main support layer 66 with four tabs 68 coupled to main support layer 66 via integral hinges 70. A pair of tabs 68 are coupled to each end of main support layer 66 and are arranged to overlap main support layer 66 at each end to form a seal retainer having three layers. In particular, two of the tabs 68 are folded to overlie the top side of main layer 66 to form a second layer, while the remaining two tabs 68 are folded to overlie the bottom side of main layer 66 to form a third layer. Accordingly, the ends of body portion 60 are three times as thick as the center section of body portion 60. Tabs 68 are spaced from retaining elements 64 to avoid interfering with the installation of seal 22 in seal receiving aperture 62.

Body portion 60 is also provided with six bolt clearance holes 80 which when body portion 60 is folded form two mounting holes for receiving fasteners 24 therethrough. In particular, main support layer 66 has one of the bolt clearance holes 80 formed therein at each of its ends, while each of the tabs 68 also has one of the bolt clearance holes 80 formed therein. Upon folding tabs 68 to overlie the ends of main support layer 66, the bolt clearance holes 80 of tabs 68 align with the bolt clearance hole 80 in main support layer 66.

Preferably, one or more of the mounting or bolt clearance holes 80 is configured to provide retention on the fastener or mounting bolts 24 after the fasteners 24 have been passed through bores 26 of component 12 which is to be coupled and sealed to the mating component 14. One possible configuration of mounting holes 80 is shown in the figures.

In the illustrated embodiment, the two clearance holes 80 of main support layer 66 are D-shaped to threadedly receive fasteners 24. In particular, the flat side of the "D" of each of these two clearance holes 80 are dimensioned such that the clearance between the flat side and the radiused portion is less than the minimum outside diameter of fasteners 24 and greater than the largest possible thread root diameter of fasteners 24. This provides a fit such that fasteners 24 may be threaded through clearance holes 80 of seal retainer 20, but seal retainer 20 will not freely slide over fasteners 24.

It should be apparent to those skilled in the art from this disclosure that a wide variety of protrusion shapes into one or more of the bolt clearance holes 80 can be used to create the same effect. For example, other shapes of bolt clearance holes 80 would be a semicircular shape(s), square or rectangular tabs, etc. intruding into the hole. Moreover, not all of the bolt clearance holes need to be configured to be retained on fasteners 24.

Preferably, seal retainer 20 is stamped to form seal receiving aperture 62, retaining elements 64 and bolt clearance holes 80 utilizing conventional metal stamping techniques. Alternatively, seal retainer 20 could be formed by electro discharge machining or other conventional manufacturing techniques.

Prior to folding, seal retainer 20 is a substantially flat planar member which lies in a single plane and has a thickness of approximately 0.003 inch to approximately 0.005 inch. Accordingly, seal retainer 20 is quite thin compared to the axial or longitudinal dimension of seal 22.

After folding of seal retainer 20, the ends of body portion 60 have a thickness of approximately 0.009 inch to approximately 0.015 inch such that the folded areas of seal retainer 20 limit the compression of seal 22 between components 12 and 14.

Seal retainer 20 is particularly useful in situations in which different seal manufacturers produce substantially the same seal, but with different axial dimensions. By removing two or all of the tabs 68, the user can change the effective thickness of seal retainer 20 to adjust the amount of compression occurring in seal 22.

Retaining elements 64 are integrally formed with main layer 66 of body portion 60 as a one piece, unitary member, i.e., seal retainer 20 is constructed of a single piece of material. Retaining elements 64 preferably have the same thickness as body portion 60 and at least initially lie in the same plane as main support layer 66 of body portion 60.

In this embodiment, seal retainer 20 is designed for coupling a single seal 22 thereto. Of course, seal retainer 20 can be constructed to accommodate more seals as needed and/or desired. In the illustrated embodiment, seal 22 is coupled to body portion 60 by providing a single seal receiving aperture 62 in body portion 60 with the free ends of retaining elements 64 being curved and arranged so that free ends of retaining elements 64 lie at points on a circle for coupling a seal 22 thereto.

Due to the resiliency of the sheet material used to construct seal retainer 20, retaining elements 64 are flexible resilient elements which can be bent out of the plane of main support layer 66 of body portion 60 for securing seal 22 thereto. In particular, seal 22 can be installed into seal receiving aperture 62 by angling the open side of seal 22 into one of the retaining elements 64 on one side and pushing seal 22 past the opposing retaining element 64 to allow it to spring into the open side of the C-section on the opposite side of seal 22. Alternatively, seal 22 can be installed into seal receiving aperture 62 by bending body portion 60 until the retaining elements 64 open sufficiently to allow the seal 22 to be inserted between the open free ends of retaining elements 64, and then reducing the bending of body portion 60 until the retaining elements 64 capture seal 22 by engaging cavity or groove 54 of seal 22.

While only two retaining elements 64 are utilized to engage and retain seal 22 to body portion 60, it will be apparent to those skilled in the art that a greater number of retaining elements 64 can be utilized for securing seal 22 to body portion 60.

Retaining elements 64 should be constructed such that their free ends are cantilevered relative to body portion 60 to allow independent deflection of each retaining element 64 relative to the other retaining element 64 for installation of seal 22 therein.

Moreover, it will be apparent to those skilled in the art from this disclosure that if more than one seal 22 is to be installed in the body portion 60 of seal retainer 20, that the number of spring arms or retaining elements 64 would most likely be increased. Also it will be apparent to those skilled in the art that when more than one seal 22 is being coupled to body portion 60 the seals may have one or more common retaining elements supporting them to accommodate the additional seals more efficiently.

Moreover, it will be apparent to those skilled in the art from this disclosure that retaining elements 64 can have a wide variety of shapes for retaining one or more seals 22 within seal receiving aperture 62. In any event, the important concept is that the retaining elements 64 engage the structure of seal 22 without interfering with the compression of seal 22 and that the retaining elements have some resiliency to allow installation of seal 22 into retainer 20.

INSTALLATION OF SEALING ASSEMBLY 10

As mentioned above, seal 22 is coupled to seal retainer 20 to properly locate seal 22 with respect to orifices 30 and 32 of components 12 and 14. This arrangement allows seal assembly 10 to be installed between components 12 and 14 without contact by hands or tools which could contaminate or damage seal 22.

Seal 22 is installed within seal receiving aperture 62 of body portion 60 via retaining elements 64. In particular, retaining elements 64 can be deflected out of the plane of body portion 60 so that the free ends of retaining elements 64 are received in the annular cavity or groove 54 of seal 22 for retaining seal 22 to body portion 60. As mentioned above, this can be done by angling one side of seal 22 such that one of the spring arms or retaining elements 64 engages annular cavity or groove 54 of seal 22. Now, seal 22 pushes past the opposing arm or retaining element 64 to allow it to spring back into the other side of cavity or groove 54 of seal 22 to capture seal 22 therebetween.

Alternatively, seal 22 can be installed into seal receiving aperture 62 by bending body portion 60 of seal retainer 20 until the free ends of spring arms or retaining elements 64 open sufficiently to allow seal 22 to be inserted between the free ends of retaining elements 64, and then reducing the bending of body portion 60 such that the retaining elements 64 return to the plane of body portion 60 to capture seal 22 via the free ends of retaining elements 64 engaging the annular cavity or groove 54 of seal 22.

Once the sealing assembly 10 is complete, sealing assembly 10 is then coupled to one of the components 12 or 14. In this particular embodiment, sealing assembly 10 is retained to component 12 via fasteners 24. In particular, fasteners 24 are inserted through bores 26 of component 12 and then threaded into the two D-shaped mounting holes 80 for retaining sealing assembly 10 thereto. In this position, seal 22 is correctly located since mounting holes 80 not only retain sealing assembly 10 to component 12 but also ensures proper location of seal 22 relative to orifices 30 and 32 of components 12 and 14, respectively.

Next, components 12 and 14 are coupled together by fasteners 24. In particular, fasteners 24 are now threaded into threaded bores 28 of component 14. When fasteners 24 are tightened down, the annular sealing surfaces of leg portions 52 of seal 22 will engage shoulders 36 of components 12 and 14 to create a seal therebetween. Moreover, seal 22 is compressed to ensure a fluid tight seal between components 12 and 14 about orifices 30 and 32. In this particular configuration, spring arms or retaining elements 64 are of a sufficient length and resiliency to allow seal 22 to be deflected slightly out of the plane of body portion 60 and into one of the counterbores 34 of either component 12 or 14. Accordingly, the dimensions and proportions of spring arms or retaining elements 64, including their length, width, tip design and the overall thickness of seal retainer 20, are determined by the size of the seals and the available area under the mating components to be sealed. The overall concept can be applied to any number of seals, bolt patterns with any number of bolts and/or obvious variations.

Sealing assembly 10 is especially applicable to the semiconductor process and vacuum equipment industries, as well as other industries where high reliability and extremely tight sealing is required, e.g., a seal which passes a leakage test of $10^{-9}$ cc/sec helium. The sealing assembly 10 is also applicable for sealing location and retention whenever an externally pressurize seal configuration is suitable.

Other variations and/or modifications of the present invention includes retaining multiple seals of various numbers and arrangements, as well as accommodating various numbers and arrangements of fasteners. Moreover, the various thicknesses and types of sheet materials can be utilized to construct seal retainer 20 in accordance with the present invention. Moreover, while circular ring seal 22 is illustrated, it will be apparent to those skilled in the art that non-circular configurations for seal 22 can also be utilized with minor modifications to the arrangement and orientation of retaining elements 64.

INSTALLATION OF SEALING ASSEMBLY 10 BETWEEN COMPONENTS 112 AND 114

Figure 8:
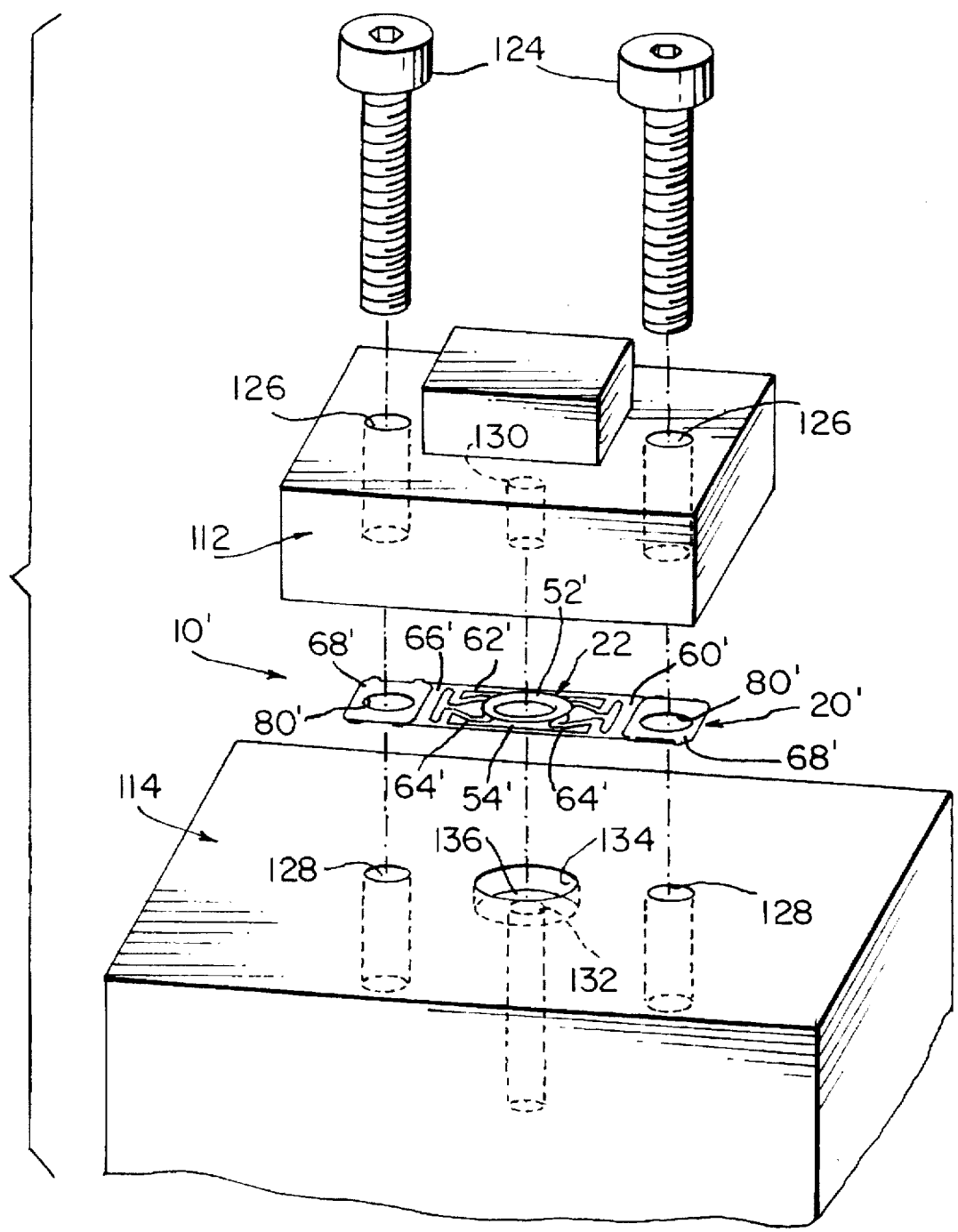
FIG. 8 is a partial exploded perspective view of the seal assembly illustrated in FIGS. 2-7, but being coupled to a pair of mating members or components with only one of the components having a counterbore.

Referring now to FIG. 8, sealing assembly 10' is illustrated as being used to seal components 112 and 114. Sealing assembly 10' is substantially identical to sealing assembly 10, discussed above, except the curved portions of retaining elements 64 have been removed from retaining elements 64' of seal retainer 20'. In other words, retainer 20' has four independent retaining elements 64' which allows unrestricted movement of seal 22. In view of the similarity between sealing assemblies 10 and 10', sealing assembly 110 will not be discussed or illustrated herein. Rather, the parts of retainer 20' will be given the same reference numeral as the corresponding part of retainer 20, except a prime mark has been added.

In this example, component 112 is releasably coupled to component 114 via two bolts or fasteners 124 in a conventional manner. Of course, more bolts can be utilized depending upon the application. More specifically, component 112 has two bores 126 for slideably receiving fasteners 124 therethrough, while component 114 has two threaded bores 128 for threadedly receiving fasteners 124 therein, such that component 112 is releasably coupled to component 114 via fasteners 124.

Component 112 also preferably includes an orifice 130 which align with orifice 132 of component 114 when components 112 and 114 are coupled together. In this embodiment, orifice 132 of component 114 is provided with a counterbore 134 which is sized to receive a portion of seal 22 therein. Counterbore 134 has a shoulder 136 for engaging one of the leg portions 52 of seal 22.

The main difference between components 12 and 14 and components 112 and 114 is that only component 114 has a counterbore 134 which has a depth substantially equal to the combined depths of counterbores 34 of components 12 and 14, as discussed above.

In view of the similarity of this second application of sealing assembly 10' to the first application, discussed above, this second application of sealing assembly 10' will not be discussed or illustrated in further detail herein.

While only two embodiments have been chosen to illustrate the present invention, it will be understood by those skilled in the art from this disclosure that various changes and modifications can be made therein without departing from the scope of the invention as defined in the appended claims.

What is claimed is:

1. A seal retainer for coupling at least one seal thereto, comprising:
   a main layer lying in a plane and having a first thickness with at least one seal receiving aperture formed therein;
   at least one resilient retaining element extending inwardly from said main layer into said at least one seal receiving aperture to a free end, said at least one retaining element being resiliently cantilevered relative to said main layer to permit said free end of said retaining element to be resiliently deflected out of said plane of said main layer to engage a cavity of the seal; and a second layer with a second thickness integrally coupled to said main layer as a one-piece, unitary member and overlapping a portion of said main layer which increases overall thickness of said seal retainer.

2. A seal retainer according to claim 1, wherein one of said layers includes at least one mounting hole spaced from said at least one seal receiving aperture.

3. A seal retainer according to claim 2, wherein said at least one mounting hole is shaped and sized for engaging a mounting member to retain said seal retainer thereon.

4. A seal retainer according to claim 1, wherein said main layer, said second layer and said at least one retaining element are constructed of a thin, flexible metallic material.

5. A seal retainer according to claim 1, wherein said main layer has a plurality of said retaining elements with free ends adapted to engage the at least one seal.

6. A seal retainer according to claim 5, wherein said free ends of said retaining elements at least initially lie in a plane of said main layer and independently engage the at least one seal.

7. A seal retainer according to claim 5, wherein said free ends of said retaining elements are curved.

8. A seal retainer according to claim 1, wherein said second layer includes a pair of tabs with one of said tabs being located on each side of said seal receiving aperture.

9. A seal retainer according to claim 1, further comprising a third layer with a third thickness integrally coupled to said main layer as a one-piece, unitary member and overlapping a portion of said main layer to further increase overall thickness of said seal retainer.

10. A seal retainer according to claim 9 wherein said second and third layers lie on opposite sides of said main layer.

11. A seal retainer according to claim 9, wherein said second layer includes a pair of first tabs with one of said first tabs being located on each of said seal receiving aperture; and
said third layer includes a pair of second tabs with one of said second tabs being located on each side of said seal receiving aperture.

12. A seal retainer according to claim 9, wherein said main layer has a plurality of said retaining elements with free ends adapted to engage the at least one seal.

13. A seal retainer according to claim 12, wherein said retaining elements are resiliently cantilevered relative to said main layer to permit a seal coupled thereto to be deflected out of said plane of said main layer.

14. A seal retainer according to claim 13, wherein one of said layers includes locating and retaining means for coupling said seal retainer in a desired location of a mating component to be sealed.

15. A seal retainer according to claim 1, wherein said second layer is spaced from said at least one seal receiving aperture along said plane of said main layer.

16. A seal retainer for coupling at least one seal thereto, comprising:
a main layer having a first thickness with at least one seal receiving aperture formed therein;
at least one resilient retaining element extending inwardly from said main layer into said at least one seal receiving aperture to a free end; and
a second layer with a second thickness integrally coupled to said main layer as a one-piece, unitary member and overlapping a portion of said main layer which increases overall thickness of said seal retainer,
said main layer, said second layer and said at least one retaining element being constructed of a thin material having a thickness ranging from approximately 0.003 inch to approximately 0.005 inch.

17. A sealing assembly for creating a seal between first and second members, comprising:
at least one annular seal with first and second longitudinally facing sealing surfaces and an outwardly facing cavity located between said first and second longitudinally facing sealing surfaces; and
a seal retainer including a main layer having a first thickness with at least one seal receiving aperture formed therein, at least one resilient retaining element integrally formed with said main layer for engaging said cavity of said at least one seal to retain said at least one seal thereto, and a second layer having a second thickness integrally coupled to said main layer as a one-piece, unitary member and overlapping a portion of said main layer which increases overall thickness of said seal retainer, said at least one retaining element being resiliently cantilevered relative to said main layer to permit said free end of said retaining element to be resiliently deflected out of said plane of said main layer to engage said cavity of said at least one seal.

18. A sealing assembly according to claim 17, wherein said cavity is a continuous, annular groove.

19. A sealing assembly according to claim 18, wherein said at least one seal is a circular ring seal.

20. A sealing assembly according to claim 17, wherein said main layer, said second layer and said at least one resilient retaining element are constructed of a thin, flexible metallic material.

21. A sealing assembly according to claim 20, wherein said main layer has a plurality of said retaining elements with free ends adapted to engage said at least one seal.

22. A sealing assembly according to claim 21, wherein said free ends of said retaining elements lie at points on a circle.

23. A sealing assembly according to claim 22, wherein said retaining elements are resiliently cantilevered relative to said main layer to permit a seal coupled thereto to be deflected out of said plane of said main layer.

24. A sealing assembly according to claim 17, wherein one of said layers includes at least one mounting hole spaced from said at least one seal receiving aperture.

25. A sealing assembly according to claim 24, wherein said at least one mounting hole is shaped and sized for engaging a mounting member to retain said main layer thereon.

26. A sealing assembly according to claim 17, wherein said second layer includes a pair of tabs with one of said tabs being located on each side of said seal receiving aperture.

27. A sealing assembly according to claim 17, wherein a third layer with a third thickness integrally coupled to said main layer as a one-piece, unitary member and overlapping a portion of said main layer to further increase overall thickness of said seal retainer.

28. A sealing assembly according to claim 27, wherein said second and third layers lie on opposite sides of said main layer.

29. A sealing assembly according to claim 27, wherein said second layer includes a pair of first tabs with one of said first tabs being located on each of said seal receiving aperture; and said third layer includes a pair of second tabs with one of said second tabs being located on each side of said seal receiving aperture.

30. A sealing assembly according to claim 27, wherein said main layer has a plurality of said retaining elements with free ends adapted to engage the at least one seal.

31. A seal retainer according to claim 17, wherein said second layer is spaced from said at least one seal receiving aperture along said plane of said main layer.

32. A sealing assembly for creating a seal between first and second members, comprising:

at least one annular seal with first and second longitudinally facing sealing surfaces and an outwardly facing cavity located between said first and second longitudinally facing sealing surfaces; and a seal retainer including a main layer having a first thickness with at least one seal receiving aperture formed therein, at least one resilient retaining element internally formed with said main layer for engaging said cavity of said at least one seal to retain said at least one seal thereto, and a second layer having a second thickness integrally coupled to said main layer as a one-piece, unitary member and overlapping a portion of said main layer which increases overall thickness of said seal retainer, said main layer, said second layer and said at least one retaining element being constructed of a thin material having a thickness ranging of approximately 0.003 inch to approximately 0.005 inch.

* * * * *